(12) United States Patent
Berggren et al.

(10) Patent No.: US 10,350,460 B2
(45) Date of Patent: Jul. 16, 2019

(54) SPORTS BALL

(71) Applicant: NIKE, Inc., Beaverton, OR (US)

(72) Inventors: Scott R. Berggren, Portland, OR (US); Michelle J. Deaton, West Linn, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/444,760

(22) Filed: Feb. 28, 2017

(65) Prior Publication Data

US 2018/0243615 A1    Aug. 30, 2018

(51) Int. Cl.

| | |
|---|---|
| *A63B 41/08* | (2006.01) |
| *A63B 45/00* | (2006.01) |
| *B41F 15/08* | (2006.01) |
| *B41F 15/42* | (2006.01) |
| *B33Y 10/00* | (2015.01) |
| *B33Y 80/00* | (2015.01) |
| *B29C 64/112* | (2017.01) |
| *B41M 1/12* | (2006.01) |
| *B41M 1/40* | (2006.01) |
| *B29L 31/52* | (2006.01) |

(52) U.S. Cl.
CPC .............. *A63B 41/08* (2013.01); *A63B 45/00* (2013.01); *B29C 64/112* (2017.08); *B33Y 10/00* (2014.12); *B33Y 80/00* (2014.12); *B41F 15/089* (2013.01); *B41F 15/42* (2013.01); *B29L 2031/52* (2013.01); *B41M 1/12* (2013.01); *B41M 1/40* (2013.01); *B41P 2200/40* (2013.01); *B41P 2215/50* (2013.01)

(58) Field of Classification Search
CPC ......... A63B 45/00; A63B 41/00; A63B 43/00; A63B 43/008; A63B 41/08; B29L 2031/52; B41M 1/40; B41F 15/089
See application file for complete search history.

(56) References Cited

U.S. PATENT DOCUMENTS

| | | | | |
|---|---|---|---|---|
| 3,740,119 | A * | 6/1973 | Sakurai | .................... G02B 3/08 |
| | | | | 353/30 |
| 4,570,931 | A * | 2/1986 | Martin | .................... A63B 39/06 |
| | | | | 473/596 |
| 4,867,452 | A | 9/1989 | Finley | |
| 4,920,039 | A * | 4/1990 | Fotland | .................... G09F 19/14 |
| | | | | 359/619 |
| 4,935,335 | A * | 6/1990 | Fotland | .................... G09F 19/14 |
| | | | | 359/463 |

(Continued)

*Primary Examiner* — Steven B Wong
(74) *Attorney, Agent, or Firm* — Quinn IP Law (57) ABSTRACT

A sports ball having a cover with an outer substrate surface is provided. The cover includes a plurality of raised lenticular features each having a terminus and a plurality of land areas. The raised lenticular features are formed from dimensional ink and disposed upon and extend from the outer substrate surface, such that each terminus is spaced apart from the outer substrate surface by a height greater than about 0.05 millimeters. The cover, including raised lenticular features and the land areas, defines a plurality of directionally-based designs within the physical surface geometry thereof, such that a first design is visible when the sports ball is viewed from a first viewing angle, a second design is visible when the sports ball is viewed from a second viewing angle, and a third design is visible when the sports ball is viewed from a third viewing angle.

20 Claims, 8 Drawing Sheets

(56) References Cited

U.S. PATENT DOCUMENTS

| | | |
|---|---|---|
| 5,232,764 A | 8/1993 | Oshima |
| 5,642,226 A * | 6/1997 | Rosenthal ............ G02B 3/0031 |
| | | 359/454 |
| 5,762,573 A | 6/1998 | Kennedy, III et al. |
| 5,778,793 A | 7/1998 | Mello et al. |
| 5,894,036 A * | 4/1999 | Tylko ...................... B41M 3/00 |
| | | 118/696 |
| 5,896,230 A | 4/1999 | Goggins |
| 6,144,496 A * | 11/2000 | Goto ................ B29D 11/00278 |
| | | 359/455 |
| 6,157,491 A * | 12/2000 | Watanabe ............ G03B 21/625 |
| | | 359/619 |
| 6,329,987 B1 * | 12/2001 | Gottfried ................ G09F 19/14 |
| | | 345/419 |
| 6,331,151 B2 * | 12/2001 | Calandro ............... A63B 41/00 |
| | | 40/327 |
| 6,490,092 B1 | 12/2002 | Goggins |
| 6,547,243 B2 * | 4/2003 | Juenger ..................... A63F 9/12 |
| | | 273/157 R |
| 6,565,089 B1 * | 5/2003 | Matos ................... A63F 9/0613 |
| | | 273/153 S |
| 6,845,580 B2 | 1/2005 | Noble |
| D548,292 S | 8/2007 | Smith |
| D548,806 S | 8/2007 | Smith |
| 7,441,776 B2 * | 10/2008 | Ustarbowski ......... A63F 9/0613 |
| | | 273/153 R |
| 7,444,770 B2 | 11/2008 | Wellington, Jr. |
| 7,462,119 B2 | 12/2008 | Kelly |
| 7,520,073 B2 | 4/2009 | Noble |
| 7,963,869 B2 | 6/2011 | Boyer et al. |
| 8,075,431 B2 | 12/2011 | Smith et al. |
| 8,303,442 B2 | 11/2012 | Smith et al. |
| 8,360,905 B2 | 1/2013 | Boyer et al. |
| 8,512,180 B2 | 8/2013 | Smith |
| 8,529,386 B2 * | 9/2013 | Nuernberg ............. A63B 41/08 |
| | | 40/327 |
| 8,545,340 B2 | 10/2013 | Roach et al. |
| 8,684,870 B2 * | 4/2014 | Ito ........................ A63B 43/002 |
| | | 473/596 |
| 9,097,822 B2 * | 8/2015 | Fujishiro ............. G02B 3/0012 |
| 9,927,626 B2 * | 3/2018 | Liu ..................... G02B 27/2214 |
| 2004/0142780 A1 * | 7/2004 | Estefano ................ A63B 37/14 |
| | | 473/604 |
| 2006/0056033 A1 | 3/2006 | Rosenthal |
| 2006/0174524 A1 | 8/2006 | Rice et al. |
| 2007/0093323 A1 | 4/2007 | Walton |
| 2007/0117662 A1 * | 5/2007 | Ma ......................... A63B 41/00 |
| | | 473/604 |
| 2008/0305900 A1 * | 12/2008 | Geisendorfer ......... A63B 41/08 |
| | | 473/596 |
| 2009/0062043 A1 | 3/2009 | Wellington, Jr. |
| 2009/0165344 A1 | 7/2009 | Noble |
| 2012/0087013 A1 | 4/2012 | Liu et al. |
| 2014/0024484 A1 | 1/2014 | Smith et al. |
| 2014/0177008 A1 | 6/2014 | Raymond et al. |
| 2014/0314896 A1 | 10/2014 | Sutton et al. |
| 2015/0268393 A1 | 9/2015 | Liles et al. |
| 2018/0224581 A1 * | 8/2018 | Takayama ................ G02B 3/06 |

\* cited by examiner

SPORTS BALL

TECHNICAL FIELD

The disclosure relates to sports balls and a method of manufacturing and forming the same.

BACKGROUND

A variety of sports balls, for example soccer balls, conventionally include a casing and an interior. The casing forms an exterior portion of the sports ball and is generally formed from a plurality of durable and wear-resistant panels joined together along abutting edge areas (e.g., with stitching or adhesives), i.e., via a seam. The casing may include an inner layer or intermediate structure that forms a middle portion of the sports ball and is positioned between the casing and the interior.

Designs and other as decorative elements such as holograms, gradient images, motion graphics, alternating color schemes, geometric designs, spin-induced contrast graphics and holistic textural patterns may be applied to the exterior surface of the casing. Designs and decorative elements may also include interlaced images printed on or applied to the casing designed for viewing through a lens.

Designs and decorative elements are conventionally applied via processes such as thermal transfer films or a release paper. Textural patterns are conventionally applied via processes such as embossing, debossing, stamping, molding, or laser etching.

SUMMARY

A sports ball and method of manufacturing the same are provided. The sports ball includes a cover having an outer substrate surface. The cover includes a surface texture that is disposed upon the outer substrate surface, and the surface texture includes a plurality of raised lenticular features that are disposed upon and extend from the outer substrate surface and a plurality of land areas disposed between the raised lenticular features. Each of the raised lenticular features is formed from a dimensional ink. Each of the raised lenticular features has a terminus that is spaced apart from the outer substrate surface by a height that is greater than about 0.05 millimeters (mm).

The cover, including raised lenticular features and the land areas of the surface texture, defines a plurality of directionally-based designs. The plurality of directionally-based designs includes a first design defined by the raised lenticular features, a second design defined by the raised lenticular features, and a third design defined by the land areas.

The first design is visible when the sports ball is viewed from a first viewing angle relative to a surface normal extending from the outer substrate surface of the cover. The second design is visible when the sports ball is viewed from a second viewing angle relative to the surface normal. The first viewing angle and second viewing angle are coplanar and on opposing sides of the surface normal. The third design is visible when the sports ball is viewed from a third viewing angle that is between the first viewing angle and the second viewing angle.

The sports ball may be formed via the method of manufacturing disclosed herein, which includes the following steps: providing a cover having an outer substrate surface; selecting a first design, a second design, and a third design; applying a base ink to the outer substrate surface; additively applying a dimensional ink to the outer substrate surface of the cover via an additive manufacturing process.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

While the present disclosure may be described with respect to specific applications or industries, those skilled in the art will recognize the broader applicability of the disclosure. Those having ordinary skill in the art will recognize that terms such as "above," "below," "upward," "downward," etc., are used descriptively of the figures, and do not represent limitations on the scope of the disclosure, as defined by the appended claims. Any numerical designations, such as "first" or "second" are illustrative only and are not intended to limit the scope of the disclosure in any way.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or"

includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The terms "A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The following discussion and accompanying figures disclose various sports ball configurations and methods relating to manufacturing of the sport balls. Although the sports ball is depicted as a soccer ball in the associated Figures, concepts associated with the configurations and methods may be applied to various types of inflatable sport balls, such as basketballs, footballs (for either American football or rugby), volleyballs, water polo balls, etc. and variety of non-inflatable sports balls, such as baseballs and softballs, may also incorporate concepts discussed herein.

Referring to the drawings, wherein like reference numerals refer to like components throughout the several views, a sports ball 10 and a method of manufacturing 100 the same are provided.

Figure 1:
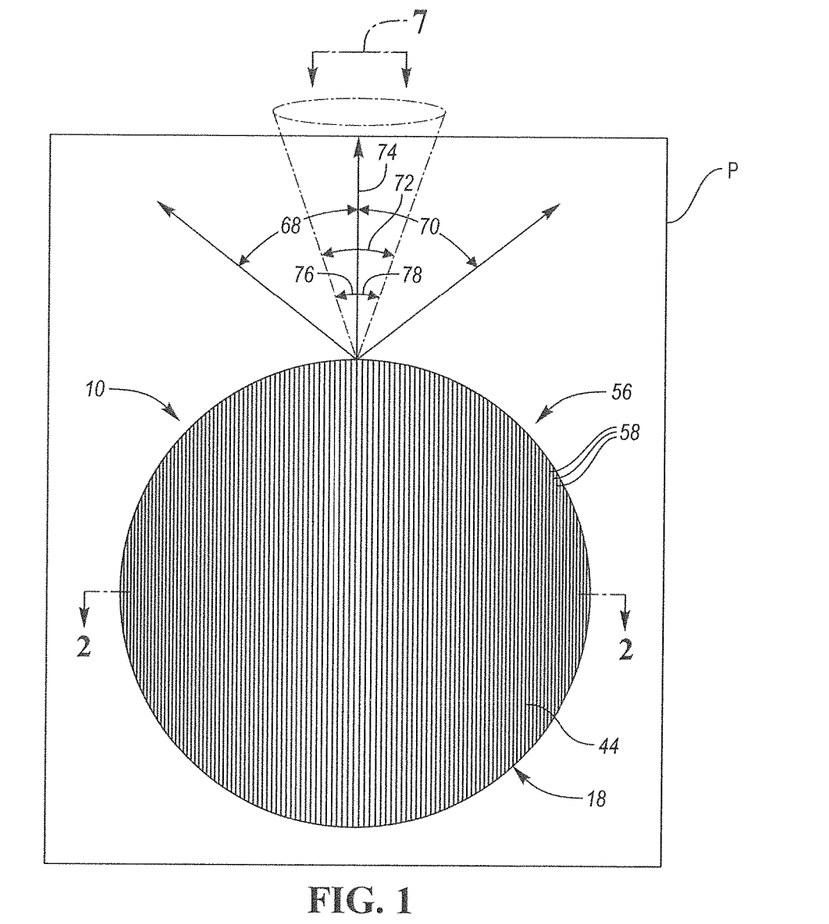
FIG. 1 is a schematic elevation view of an example sports ball with a surface texture of a dimensional ink additively applied to the outer substrate surface.
Figure 2:
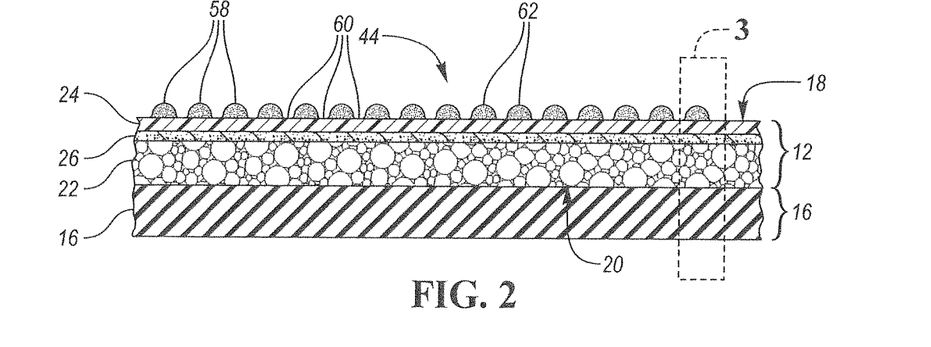
FIG. 2 is a schematic cross-section view of the sports ball taken along line 2-2 in FIG. 1, wherein the surface texture is disposed on the outer substrate surface, such that the surface texture defines a surface profile that includes a plurality of raised lenticular features and a plurality of land areas.
Figure 3:
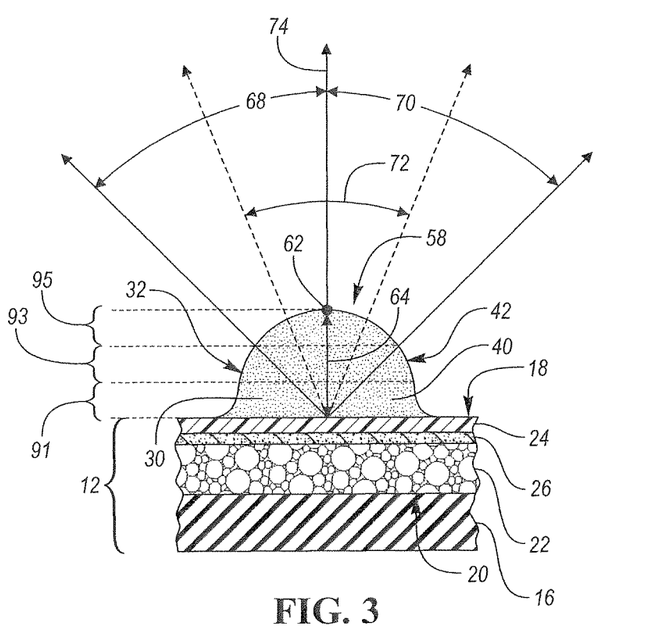
FIG. 3 is an enlarged, schematic, example cross-section view of a portion of FIG. 2, wherein and an example raised lenticular feature of the surface texture is shown in a first example configuration.
Figure 4:
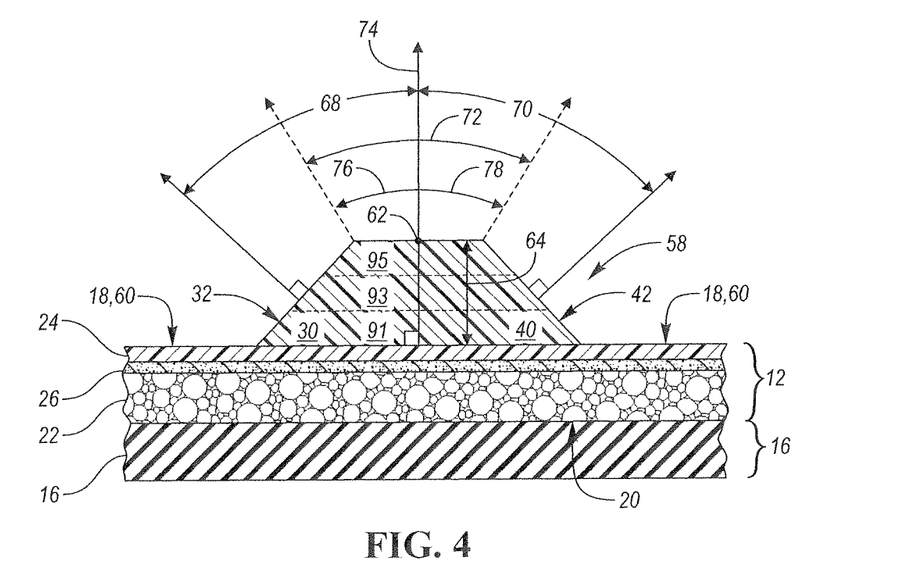
FIG. 4 is a schematic cross-section view of an example raised lenticular feature of the surface texture shown in a second example configuration.

As shown in FIG. 1, the sports ball 10 may be an inflatable sports ball such as a soccer ball or the like or a non-inflatable sports ball 10 such as a softball or the like. A sports ball 10 having the general configuration of a soccer ball is depicted in FIG. 1. The sports ball 10 may have a layered structure including a cover 12 and an interior 16 (FIGS. 2-4). The cover 12 forms an exterior portion of the sports ball 10. The interior 16 forms an interior portion of sports ball 10. The sports ball 10 may also include an intermediate structure located interior to the cover 12 between the cover 12 and the interior 16.

In a non-inflatable example configuration of the sports ball 10, the interior 16 may be one of a solid mass and hollow mass, which is fixed in size. In an inflatable example configuration of the sports ball 10, the interior 16 may be a bladder. In such an example configuration, in order to facilitate inflation (i.e., fill the interior with pressurized air), the interior 16 generally includes a valved opening that extends through the cover 12, and the intermediate structure, if present, thereby being accessible from the outer substrate surface 18 of the sports ball 10. Upon inflation, the bladder 16 is pressurized and the pressurization induces the sports ball 10 to take on a designated three-dimensional shape. More particularly, pressure within bladder 16 causes the bladder 16 to place an outward force upon the cover 12 on an inner substrate surface 20.

The cover 12 forms an exterior portion of the sport ball 10. As shown in FIGS. 2-4, the cover 12 includes the outer substrate surface 18, i.e., the exterior surface of the sports ball 10 and the inner substrate surface 20 opposite the outer substrate surface 18. The inner substrate surface 20 may be disposed adjacent to the ball interior 16. The cover 12 may be composed as a layered structure including an inner layer 22, an outer film 24, and a bonding material 26 disposed between the inner layer 22 and the outer film 24.

The inner layer 22 may include the inner substrate surface 20, wherein the inner substrate surface 20 is positioned adjacent to the ball interior 16. The inner layer 22 may be composed of a polymeric material, a polymer foam material, a foam material, textiles, or the like. Examples of suitable polymer materials include, but are not limited to, polyurethane, polyvinylchloride, polyamide, polyester, polypropylene, polyolefin, and the like. Examples of suitable polymer foam materials include, but are not limited to, polyurethane, ethylvinylacetate, and the like. Examples of suitable textile materials include, but are not limited to, a woven or knit textile formed from polyester, cotton, nylon, rayon, silk, spandex, or a variety of other materials. A textile material may also include multiple materials, such as a polyester and cotton blend. The inner layer 22 may further provide a softened feel to the sports ball, impart energy return, and restrict expansion of bladder 16, in an inflatable ball example.

The outer film 24 may be bonded to the inner layer 22 via the bonding material 26. The outer film 24 may be a polyurethane film or the like.

The cover 12 may be generally formed by a plurality panels, wherein each panel 28 (FIG. 8) has a respective panel surface that defines a portion of the outer substrate surface 18. The respective panels may be coupled together along abutting edge areas 36 (FIG. 8) via at least one seam. The panels 28 may be coupled along the abutting edge areas 36 with stitching, bonding, welding, adhesives, or another suitable coupling method. The cover 12, when part of an example soccer ball 10, may include various numbers of panels 28, such as the conventional eleven (11) panels or any other number of panels 28. The cover 12 may also exhibit a substantially uniform or unbroken configuration that does not include panels 28 joined at abutting edge areas 36 via seams, or includes fewer panels 28. In configurations, wherein a reduced number of panels 28 are present or the ball 10 exhibits a substantially uniform or unbroken configuration, indentations or pseudo seams in the cover 12 may be positioned to impart the appearance of panels 28.

As illustrated throughout FIGS. 1-7, the cover 12 includes a surface texture 44 disposed upon and additively applied to the outer substrate surface 18. The surface texture 44 may form decorative or aesthetic elements upon the sports ball 10, display branding of the sports ball 10, via a logo contained therein, and may further be applied in such an orientation as to optimize grip at the point of contact with the user's hand and/or foot, or to improve aerodynamics during flight. The surface texture 44 may be disposed on a small portion of the outer substrate surface 18, on a single panel surface, on a select group of panel surfaces, or upon a majority of the outer substrate surface 18 (FIGS. 1 and 5-7).

The surface texture 44 comprises a plurality of raised lenticular features 58 that extend from the outer substrate surface 18. As shown in FIGS. 2-4, each of the plurality of raised lenticular features 58 has a terminus 62 that is spaced apart from the outer substrate surface 18 by a height 64 that is greater than about 0.05 millimeters (mm). In one example embodiment, the height 64 may be from about 0.07 millimeters (mm) to about 0.15 millimeters (mm). In another example, the height 64 is about 0.11 millimeters (mm). As shown in FIGS. 3 and 4, each of the plurality of raised lenticular features 58 may have a first portion 30 including a first sidewall 32 and a second portion 40 including a second sidewall 42. In such examples, it is beneficial for the height 64 to be at least 0.05 millimeters (mm) and less than 0.15 millimeters (mm) in order to enhance playability of the ball 10. Raised lenticular features 58 having heights 64 in the aforementioned range allow for visibility of the respective designs 46, 47, 48 and overall topographical design 56, while also exhibiting the desired grip or contact between a user and/or player's hand or foot and the exterior surface of the ball 10 while still allowing the ball 10 to maintain desired aerodynamic and flight characteristics.

The surface texture 44 may further comprise a plurality of land areas 60 that are flush with the outer substrate surface 18. Each land area 60 may be disposed between a plurality of raised lenticular features 58, and likewise, each raised lenticular feature 58 may be positioned between a plurality of land areas 60. Said another way, the plurality of raised lenticular features 58 and the plurality of land areas 60 define a surface profile 50 (FIGS. 2-4) that includes an alternating and repeating series of the land areas 60 and the raised lenticular features 58.

As shown in FIGS. 1 and 5-7, the surface texture 44 may form a topographical design 56 across the outer substrate surface 18 of the cover 12. The topographical design 56 may take many forms, for example, the topographical design 56 may include, but is not limited to, a series of concentric shapes, such as concentric circles. The topographical design 56 may also include, but is not limited to, a series of raised polygonal shapes; a series of raised letters; a series of raised stars; a waffle-type pattern; a series of raised angular designs, raised triangular designs positioned in a stacked or repeating format, and/or raised caret-type designs positioned in a stacked or repeating format; and other unique and abstract designs or patterns. Further, the surface texture 44 need not be uniform across the majority of the outer substrate surface 18, as is often the case with surface textures formed on the outer substrate surface 18 of sports balls 10 by methods such as embossing, debossing, stamping, release paper, or the like.

Figure 5:
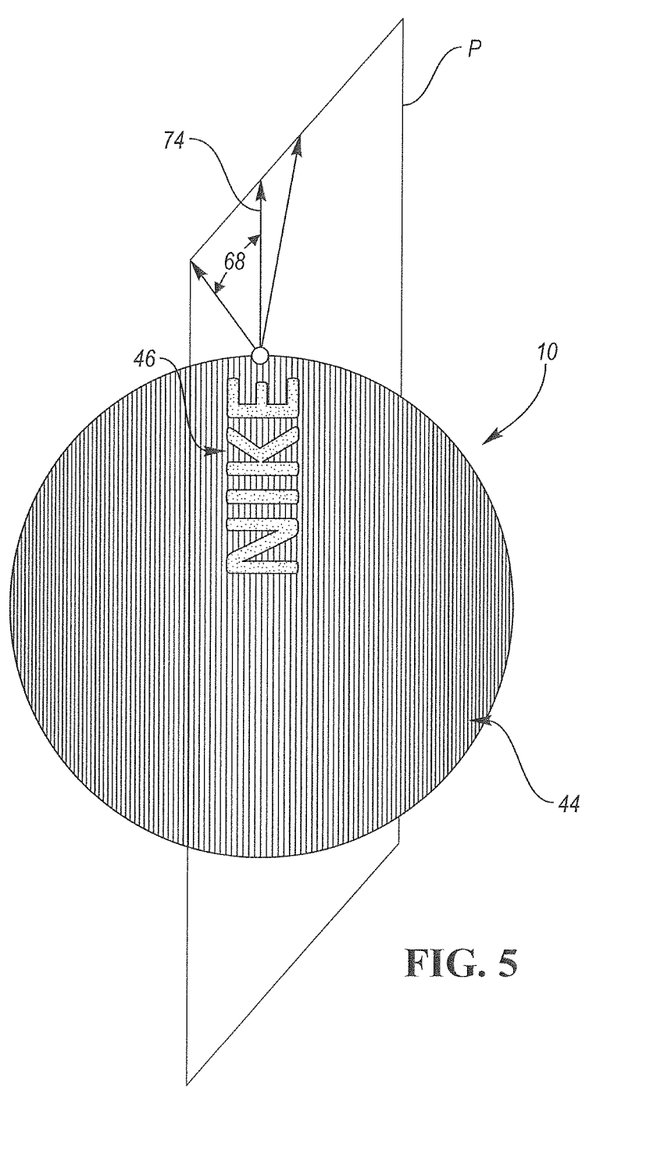
FIG. 5 is a schematic elevation view of the sports ball shown in FIG. 1 viewed from an example first viewing angle.
Figure 6:
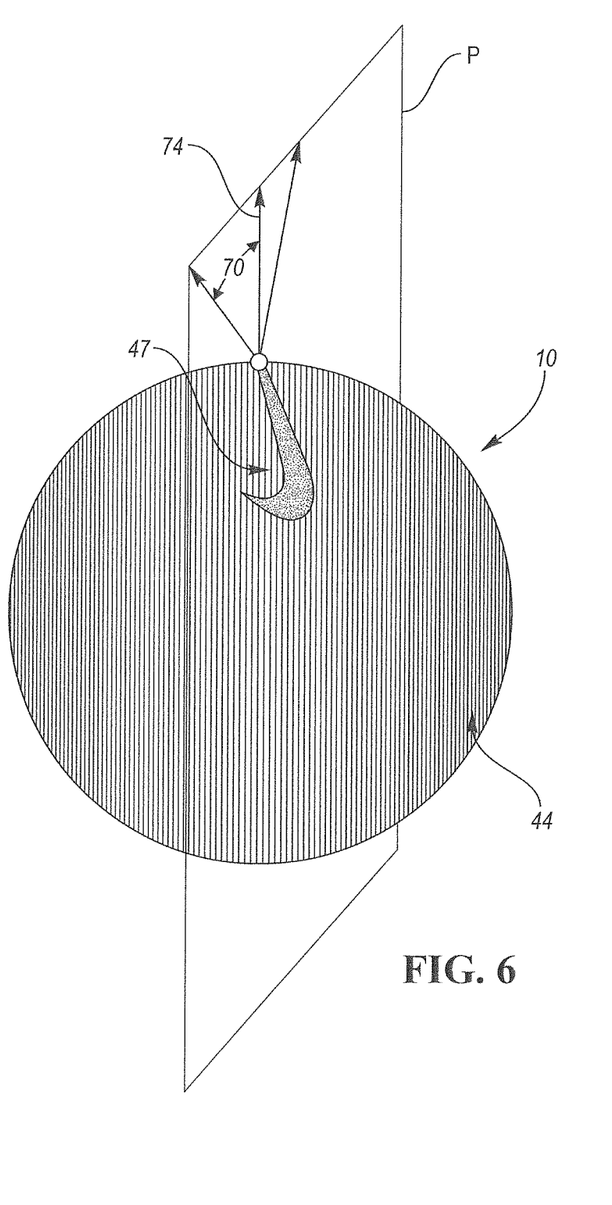
FIG. 6 is a schematic elevation view of the sports ball shown in FIG. 1 viewed from an example second viewing angle.
Figure 7:
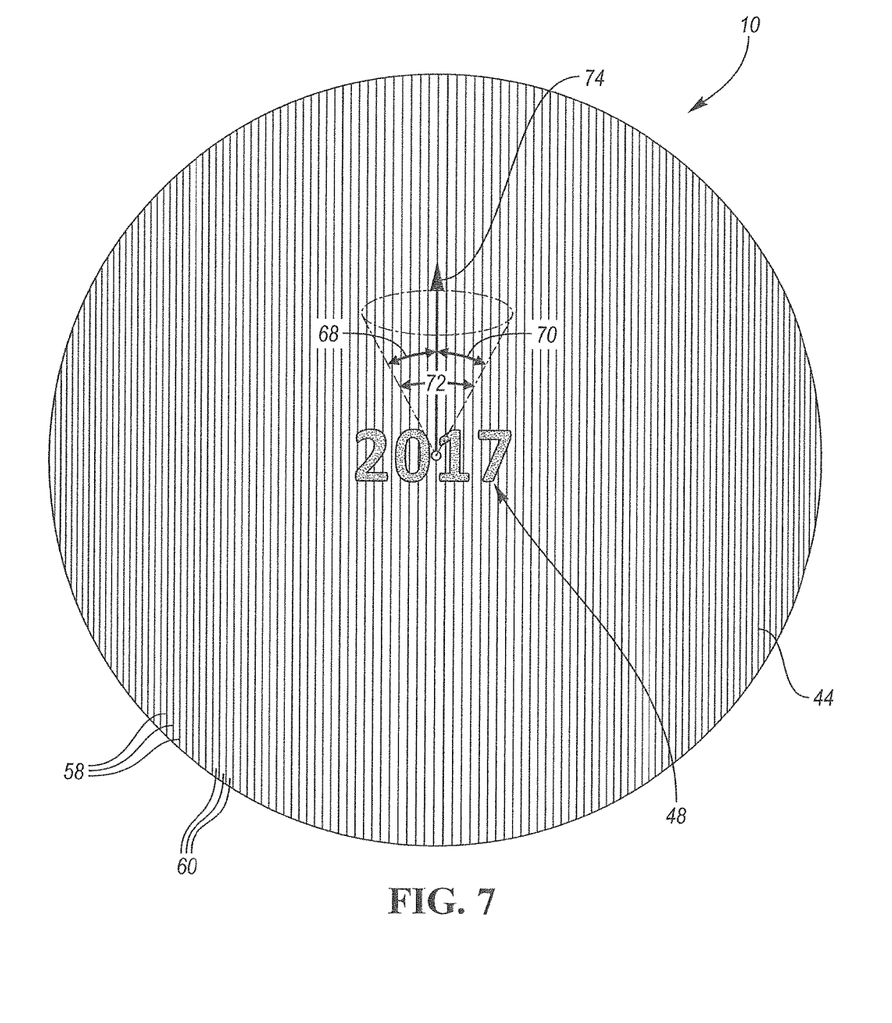
FIG. 7 is a schematic plan view of the sports ball shown in FIG. 1 viewed from an example third viewing angle.

Further, the cover 12, including the plurality of raised lenticular features 58, i.e., the surface texture 44 defines a plurality of directionally-based designs 46, 47, 48. As shown in FIGS. 5-7, the plurality of directionally-based designs includes a first design 46 (FIG. 5), a second design 47 (FIG. 6), and a third design 48 (FIG. 7). The first design 46, the second design 47, and the third design 48 may be alternating color schemes, geometric designs, spin-induced contrast graphics, motion graphics, letters, words, logos, brand names, or other abstract or graphic designs. In the examples shown in FIGS. 5-7, the first design 46 is embodied as a logo, the second design 47 is embodied as a brand name, and the third design 48 is embodied as a series of numbers or letter, more particularly a model year.

The first design 46 is visible when the sports ball 10 is viewed from a first viewing angle 68 relative to a surface normal 74 (FIGS. 1 and 5) extending from the outer substrate surface 18. More particularly, the first design 46 is visible when the first viewing angle 68 is greater than about fifteen (15) degrees relative to the surface normal 74. The second design 47 is visible when the sports ball 10 is viewed from a second viewing angle 70 relative to a surface normal 74 (FIGS. 1 and 6) extending from the outer substrate surface 18. More particularly, the second design 47 is visible when the second viewing angle 70 is greater than about fifteen (15) degrees relative to the surface normal 74.

Referring to FIGS. 1 and 5-7, the first viewing angle 68, the second viewing angle 70, and the surface normal 74 are coplanar, i.e., disposed in a plane P. The first viewing angle 68 and second viewing angle 70 are further disposed on opposing sides of the surface normal 74 in plane P. Said another way, the first viewing angle 68 is measured in a first rotational direction 76 from the surface normal 74 within plane P and the second viewing angle 70 is measured in a second rotational direction 78 from the surface normal 74 within plane P. In such an instance, the first direction 76 and the second direction 78 are opposing rotational directions within plane P.

Referring particularly to FIGS. 1 and 7, the third design 48 is visible when the sports ball 10 is viewed from a third viewing angle 72. The third viewing angle 72 is between the first viewing angle 68 and the second viewing angle 70, and is defined when the first viewing angle 68 is less than fifteen (15) degrees and when the second viewing angle is less than fifteen (15) degrees. Said another way, the third viewing angle 72 includes the first fifteen (15) degrees measured in the first rotational direction 76 from the surface normal 74 within plane P and the first fifteen (15) degrees measured in the second rotational direction 78 from the surface normal within plane P.

Each of the raised lenticular features 58 is formed from a dimensional ink. The dimensional ink may be a resin-based ink, a puff ink, a water-based ink, a water-based silicone ink, or the like suitable for additive manufacturing and/or dimensional printing via the additive manufacturing process 100. More particularly, the dimensional ink may be a hybrid ink containing a polyurethane resin component and a puff ink component. The dimensional ink may also include an organic compound such as Cyclohexanon $(CH_2)_5CO$. The dimensional ink may also include a Polyurethane powder to add texture to the ink.

In one example embodiment, the dimensional ink may include a polyurethane resin component in a concentration or percentage-based amount of from about 15% to about 25%, a puff ink component in a concentration or percentage-based amount of less than about 7%, and a Cyclohexanon $(CH_2)_5CO$ component in a concentration or percentage-based amount of from about 65% to about 80%. In such an example, the viscosity of the dimensional ink may be from about 300 decipascalsecond (dpa·s) to about 400 dpa·s, the percentage of solid content may be from about 25% to about 30%, and the Volatile Organic Compounds (VOCs) may be from about 710 g/L to about 770 g/L.

The dimensional ink may be clear in color such that the dimensional ink is transparent or translucent. The dimensional ink also may be pigmented to a predetermined coloration.

In one example embodiment wherein the dimensional ink is clear, i.e., transparent or translucent, the sports ball 10 further includes a design layer, which contains the respective directionally-based designs 46, 47, 48. The design layer may contain the respective directionally-based designs 46, 47, 48 in a holistic fashion. Alternatively, the design layer may contain the respective designs 46, 47, 48 as interlaced images, e.g., each image (the first design 46) is sliced into thin strips and interlaced with one or more similarly arranged images (the second design 47 and the third design 48). The design layer is applied to the outer substrate surface 18 and disposed between the outer substrate surface 18 and the raised lenticular features 58. In this example, the raised lenticular features 58 are composed of a clear-colored dimensional ink and are additively applied to the outer substrate surface 18 upon the design layer.

When the design layer contains the respective directionally-based designs 46, 47, 48 as holistic images or color schemes and the raised lenticular features 58 are composed of a clear colored dimensional ink are additively applied upon the design layer and positioned such that the raised lenticular features 58 act as lenses. In such an instance, the first viewing angle 68 from which the first design 46 is visible, is a function of the height 64 of the raised lenticular features 58 in the local area of outer substrate surface 18 occupied by the first design 46; the second viewing angle 70 from which the second design 47 is visible, is a function of the height 64 of the raised lenticular features 58 in the local area of the outer substrate surface 18 occupied by the second design 47.

When the design layer contains the respective directionally-based designs 46, 47, 48 as interlaced images, the raised lenticular features 58 are composed of a clear colored dimensional ink are additively applied upon the design layer and positioned such that the raised lenticular features 58 act as lenses. Accordingly, for example, when the sports ball 10 is viewed from the first viewing angle 68, the raised lenticular features 58 magnify the linear strips of the first design 46, and, when the sports ball 10 is viewed from the second viewing angle 70, the raised lenticular features 58 magnify the linear strips of the second design 47.

In example embodiments wherein a colored or pigmented ink comprises the raised lenticular features 58, the Polyurethane resin component of the dimensional ink will be composed of from about 45% to about 99% of white-colored polyurethane resin and from about 1% to about 65% polyurethane resin of at least one desired color other than white. The colored polyurethane resin may include multiple colors of resin, such that the predetermined mixture produces the predetermined and/or desired coloration.

Further, in example embodiments wherein a colored or pigmented ink comprises the raised lenticular features 58, the directionally-based designs 46, 47, 48 are embodied in the surface texture 44, i.e., the raised lenticular features 58 and the land areas 60. As such, the first design 46 (FIG. 5) may be defined by the raised lenticular features 58, the second design 47 (FIG. 6) may be defined by the raised lenticular features 58, and the third design 72 (FIG. 7) may be defined by the land areas 60. In this example, the sports ball 10 does not include a design layer, a lenticular lens, or a plurality of lenses, such as a convex lens or a cylindrical lens. Rather, in this example embodiment, the coloration and the physical surface geometry of the raised lenticular features 58 provide the lenticular effect of the respective directionally-based designs 46, 47, 48. As such, the change in viewing angle that is needed to create the lenticular effect, i.e., to change the viewable design from one respective design to another respective design, is much larger than if using a lenticular lens to create the effect. Resultantly, the directionally-based designs 46, 47, 48 are transforming lenticular designs, wherein the directionally-based designs 46, 47, 48 are substantially different from each other and require a relatively large change in angle of view to switch visibility from one design to another.

Referring to FIGS. 3 and 4, the raised lenticular features 58 may have a first portion 30 including a first sidewall 32 and a second portion 40 including a second sidewall 42. In the example embodiment, wherein the dimensional ink is pigmented and the directionally-based designs 46, 47, 48 are embodied in the surface texture 44, i.e., the raised lenticular features 58 and the land areas 60, the first design 46 may be defined by one portion, e.g., the first portion 30 and first sidewall 32 of a respective raised lenticular feature 58, and the second design 47 may be defined by another portion, e.g., the second portion 40 and second sidewall 42 of a respective raised lenticular feature 58. The third design 48 may be defined by the land areas 60.

In one example, the first portion 30 and the first sidewall 32 defining the first design 46 may be composed of a dimensional ink of a first color. The second portion 40 and the second sidewall 42 defining the second design 47 may be composed of a dimensional ink of a second color. The land areas 60 defining the third design 48 may be a third color.

The first color may be the same as the second color in some instances or the first color may be different than the second color, dependent upon the make-up of the respective first design 46 and the second design 47 and the location of the respective raised lenticular features 58 on the outer substrate surface 18 and within the respective designs 46, 47. Again, dependent upon the make-up of the respective third design 48 and the location of the respective land areas 60 on the outer substrate surface 18 and within the third design 48, the third color may be the same as the first color and the second color; the third color may be that same as the first color and different than the second color; the third color may be the same as the second color and different than the first color; or the third color may be different than each of the first color and the second color.

Referring to FIGS. 8-11, the sports ball 10 may be manufactured via the method of manufacturing 100 disclosed herein. The present method 100 of manufacturing the sports ball 10 may include four general steps 101-104, as shown in flow diagram form in FIG. 10.

Figure 10:
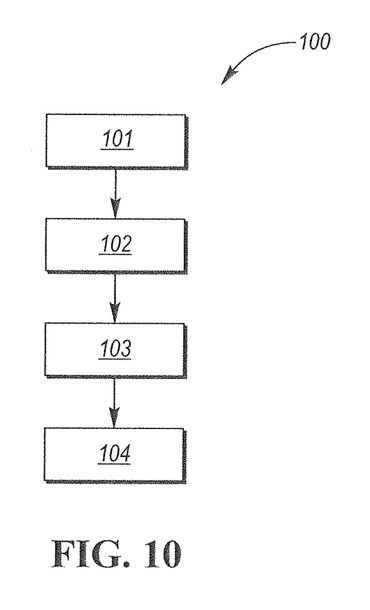
FIG. 10 is a flow diagram detailing the method of manufacturing the sports ball.

At step 101, a cover 12 is provided. As detailed herein above, the cover 12 has an outer substrate surface 18, i.e., the exterior surface of the sports ball 10 and an inner substrate surface 20 opposite the outer substrate surface 18. The cover 12 may be generally formed of a plurality panels 28 wherein each panel has a respective panel surface that defines a portion of the outer substrate surface 18.

At step 102, a plurality of directionally-based designs are selected, namely first design 46, a second design 47, and a third design 48 shown by example in FIGS. 5-7. The first design 46, the second design 47, and the third design 48 may be alternating color schemes, geometric designs, spin-induced contrast graphics, motion graphics, letters, words, logos, brand names, or other abstract or graphic designs. In the examples shown in FIGS. 5-7, the first design 46 (FIG. 5) is embodied as a logo, the second design 47 (FIG. 6) is embodied as a brand name, and the third design 48 (FIG. 7) is embodied as a series of numbers or letter, more particularly a model year. The directionally-based designs 46, 47, 48 may be transforming lenticular designs, wherein the directionally-based designs 46, 47, 48 are substantially different from each other and require a relatively large change in angle of view to switch visibility from one design to another.

At step 103, optionally, a base ink may be applied to the outer substrate surface 18, such that the base ink is disposed between the outer substrate surface 18 and the dimensional ink that forms the surface texture 44. The base ink may be a primer that is designed to create a better bond between the dimensional ink and the outer substrate surface 18. The base ink may have a viscosity from about 80 decipascalsecond (dpa·s) to about 200 dpa·s and the Volatile Organic Compounds (VOCs) may be from about 700 g/L to about 900 g/L.

The base ink may be applied via a silk screening process or the like. The base ink may be applied to the outer substrate surface 18 via an immersion tool 94 controlled by an automated print apparatus 89, shown in FIG. 9, and discussed herein in more detail with respective to steps 201-203 of step 104. The base ink may be applied in multiple layers, such that the immersion tool 94 completes at least one stroke or pass over the outer substrate surface 18 for each base ink layer application. For example, the base ink may be applied in two (2) layers, wherein the immersion tool 94 completes two (2) strokes or passes in association with each base ink layer application, i.e., totaling four (4) immersion tool 94 strokes or passes of the outer substrate surface 18.

At step 104, the dimensional ink is additively applied to the outer substrate surface 18 via an additive manufacturing process to form the plurality of raised lenticular features 58 upon the outer substrate surface 18. If a base ink is applied to the outer substrate surface 18 at step 103, the base ink is disposed between the outer substrate surface 18 and the dimensional ink. As such, the dimensional ink forms the raised lenticular features 58 disposed on the outer substrate surface 18.

Each of the raised lenticular features 58 extend from the outer substrate surface 18. As shown in FIGS. 2-4, each of the plurality of raised lenticular features 58 has a terminus 62 that is spaced apart from the outer substrate surface 18 by a height 64 that is greater than about 0.05 millimeters (mm). In one example embodiment, the height 64 may be from about 0.07 millimeters (mm) to about 0.15 millimeters (mm). In another example, the height 64 is about 0.11 millimeters (mm). As shown in FIGS. 3 and 4, each of the plurality of raised lenticular features 58 may have a first portion 30 including a first sidewall 32 and a second portion 40 including a second sidewall 42.

The cover 12 may also include a plurality of land areas 60 that are flush with the outer substrate surface 18. Each land area 60 is disposed between a plurality of raised lenticular features 58, and likewise, each raised lenticular feature 58 is positioned between a plurality of land areas 60. Said another way, the plurality of raised lenticular features 58 and the plurality of land areas 60 define a surface profile 50 (FIG. 2) that includes an alternating and repeating series of the land areas 60 and the raised lenticular features 58.

The cover, including the plurality of lenticular features 58 and the land areas 60, defines a plurality of directionally-based designs including a first design 46, a second design 47, and a third design 48. Said another way, the first design 46, the second design 47, and the third design 48 are embodied in the surface texture 44, i.e., the raised lenticular features 58 and the land areas 60. As such, the first design 46 (FIG. 5) may be defined by the raised lenticular features 58, the second design 47 (FIG. 6) may be defined by the raised lenticular features 58, and the third design 72 (FIG. 7) may be defined by the land areas 60. More particularly, the first design 46 (FIG. 5) may be defined by the first portions 30 and first sidewalls 32 of the raised lenticular features 58. The second design 47 (FIG. 6) may be defined by the second portions 40 and the sidewalls 42 of the raised lenticular features 58. The third design 72 (FIG. 7) may be defined by the land areas 60. In this example embodiment the coloration and the physical surface geometry of the surface texture 44, i.e., raised lenticular features 58 and the land areas 60 provide a lenticular effect of the respective directionally-based designs 46, 47, 48. As such, the change in viewing angle that is needed to create the lenticular effect, i.e., to change the viewable design from one respective design to another respective design, is much larger than if using a lenticular lens to create the effect. Resultantly, the directionally-based designs 46, 47, 48 are transforming lenticular designs, wherein the directionally-based designs 46, 47, 48 are substantially different from each other and require a relatively large change in angle of view to switch visibility from one design to another.

In such an example, the first design 46 is visible when the sports ball 10 is viewed from a first viewing angle 68 relative to a surface normal 74 (FIGS. 1 and 5) extending from the outer substrate surface 18. More particularly, the first design 46 is visible when the first viewing angle 68 is greater than about fifteen (15) degrees relative to the surface normal 74. The second design 47 is visible when the sports ball 10 is viewed from a second viewing angle 70 relative to a surface normal 74 (FIGS. 1 and 6) extending from the outer substrate surface 18. More particularly, the second design 47 is visible when the second viewing angle 70 is greater than about fifteen (15) degrees relative to the surface normal 74.

Referring to FIGS. 1 and 5-7, the first viewing angle 68, the second viewing angle 70, and the surface normal 74 are disposed in a plane P, such that the first viewing angle 68 and the second viewing angle 70 are coplanar. The first viewing angle 68 and second viewing angle 70 are further disposed on opposing sides of the surface normal 74. Said another way, the first viewing angle 68 is measured in a first direction 76 from the surface normal 74 within plane P and the second viewing angle 70 is measured in a second direction 78 from the surface normal 74 within plane P. In such an instance, the first direction 76 and the second direction 78 are opposing rotational directions within plane P.

The third design 48 is visible when the sports ball 10 is viewed from a third viewing angle 70 (FIGS. 1 and 7). The third viewing angle 70 is between the first viewing angle 68 and the second viewing angle 72, and is defined when the first viewing angle 68 is less than fifteen (15) degrees and when the second viewing angle is less than fifteen (15) degrees.

The additive manufacturing process is a process by which the three dimensional (3D) design data of the surface texture 44 and the first design 46, second design 47, and third design 48 is used to build up a component, i.e., the raised lenticular features 58 of the surface texture 44 in layers by depositing material, i.e., the dimensional ink. Suitable additive manufacturing processes include, but are not limited to silk screen printing, 3D printing, additive layer manufacturing, stereolithography, and the like.

Figure 11:
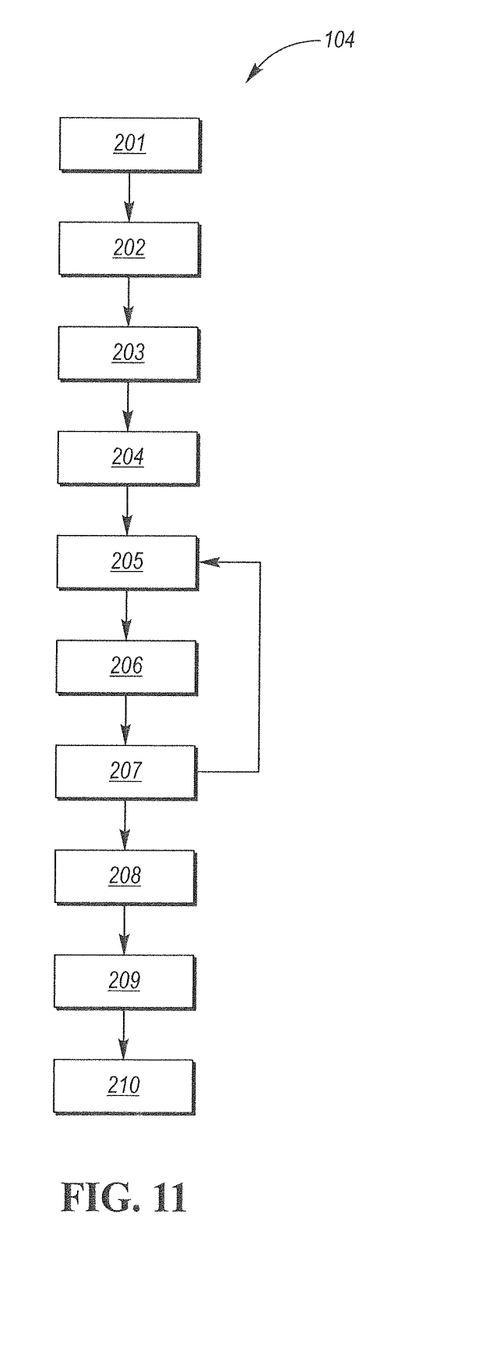
FIG. 11 is a flow diagram further detailing the step of additively applying a dimensional ink to the outer substrate surface to form the plurality of raised lenticular features upon the outer substrate surface, via an additive manufacturing process.

Step 104, additively applying a dimensional ink to the outer substrate surface 18 via an additive manufacturing process is further detailed in FIG. 11. Particularly, step 104 of additively applying a dimensional ink to the outer substrate surface 18 via an additive manufacturing process includes several sub-steps detailed in flow diagram form in FIG. 11 as steps 201-210.

Figure 8:
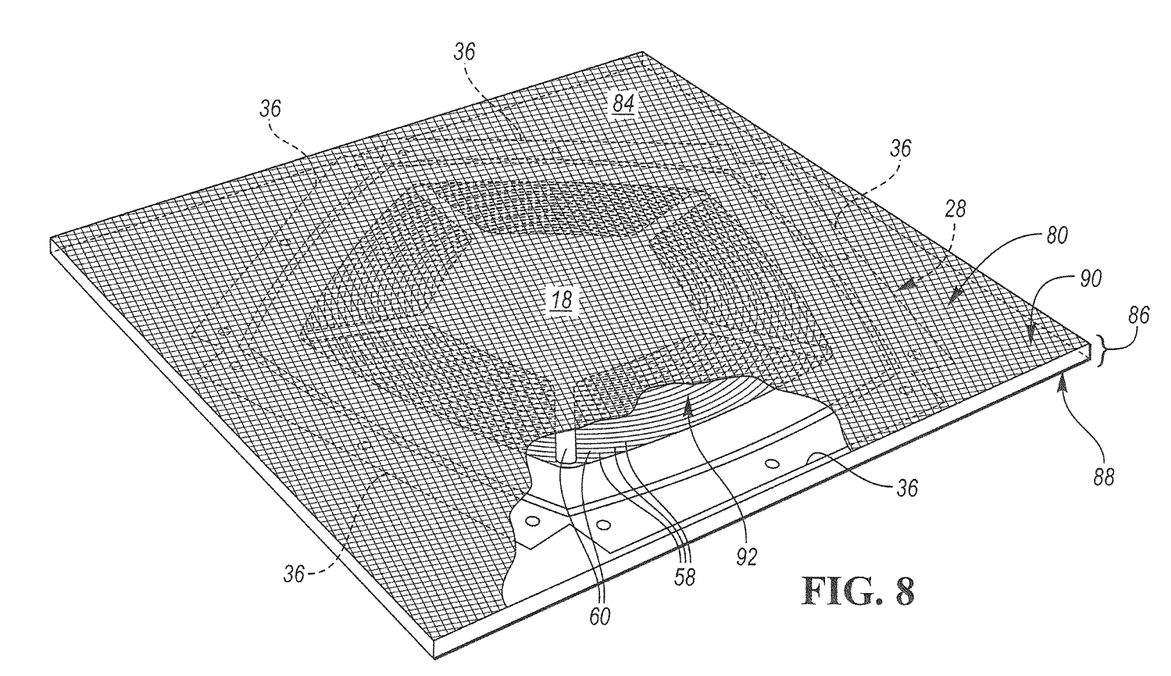
FIG. 8 is a schematic perspective view of a screen positioned over an example panel.
Figure 9:
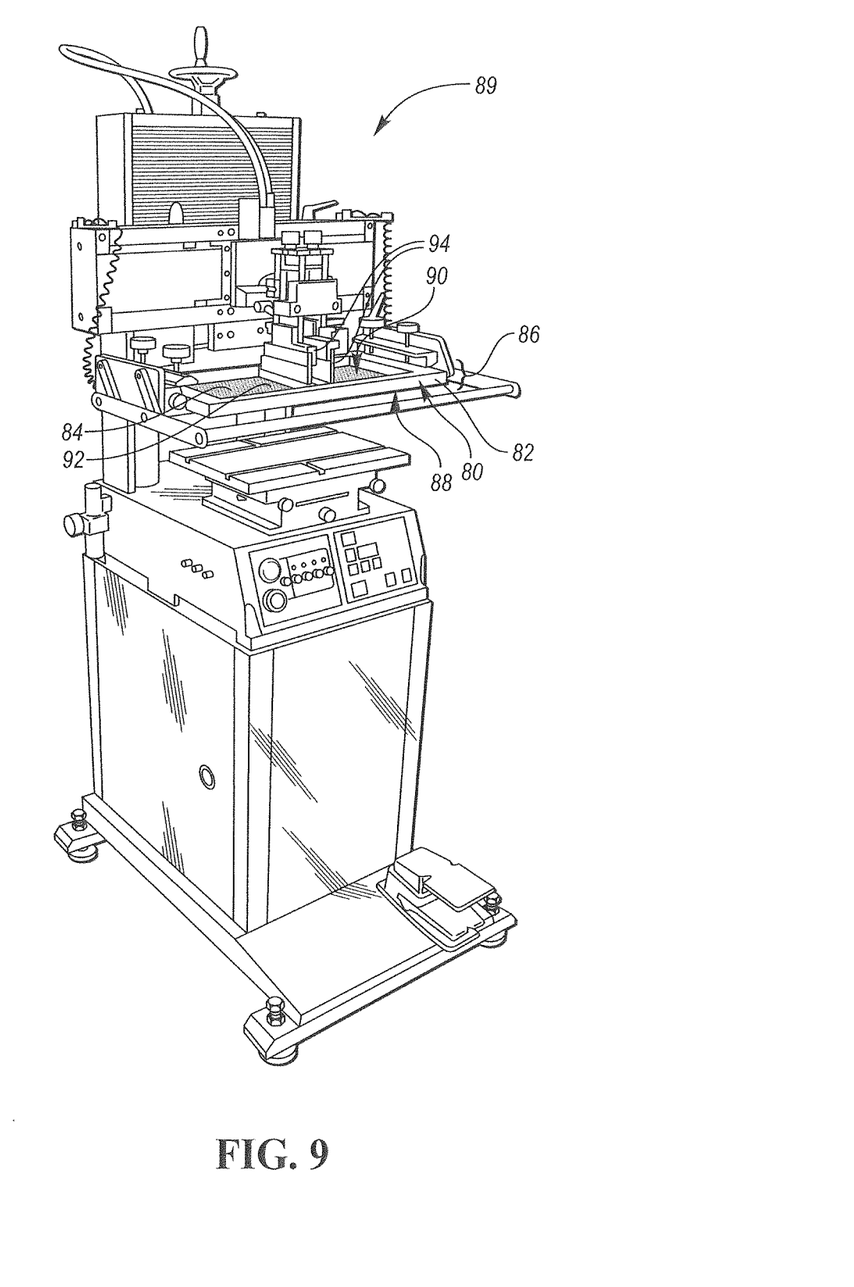
FIG. 9 is a schematic perspective view of an example additive manufacturing apparatus.

At step 201, a screen 80 is positioned over the outer substrate surface 18, such that the outer substrate surface 18 faces the screen 80, as shown in FIG. 8. Referring further to FIGS. 8 and 9, the screen 80 may have a substrate side 88 positioned adjacent to the outer substrate surface 18 and an open side 90 positioned opposite the substrate side 88. The screen 80 may have a frame 82 and an interior mesh portion 84. The interior mesh portion 84 may be contained within the frame 82 and may have a thickness 86. The thickness 86 of the interior mesh portion 84 is determined by the height 64 of the raised lenticular features 58. In accordance with the example embodiment detailed herein above, the thickness 86 is greater than about 0.05 millimeters (mm). The thickness 86 must be greater than the height 64, as the interior mesh portion 84 of the screen 80 and the outer substrate surface 18 define an inkwell 92 configured to receive the dimensional ink to form the raised lenticular features 58 of the surface texture 44.

The interior mesh portion 84 may be blocked with a blocking stencil in areas that do not include surface texture 44, such that the dimensional ink is restricted from entering the inkwell 92 and proceeding to the outer substrate surface 18 in such areas. Said another way, the dimensional ink is only allowed to pass through the screen 80, into the inkwell 92, and onto the outer substrate surface 18 in the areas not blocked by the blocking stencil.

At step 202, the inkwell 92 is flooded with a first application of the dimensional ink. At step 203, and as shown in FIG. 9, the open side 90 of the screen 80, within the frame 82, is traversed by an immersion tool 94 controlled by an automated print apparatus 89. As the immersion tool 94 traverses the open side 90 of the screen 80, the first application of dimensional ink, flooded into the inkwell 92 at step 202, is compressed and distributed through the interior mesh portion 84 of the screen 80, into the inkwell 92, and on to the outer substrate surface 18. In one example, the immersion tool 94 may complete two (2) strokes or passes of the open side 90 of the screen 80 to compress and distribute each application of dimensional ink, including the first application of dimensional ink.

At step 204, an intermediate curing process is initiated for the first application of the dimensional ink. The curing procedure for the dimensional ink may be one of time drying, heated curing or drying, or the like. In one example, the first application of dimensional ink is cured via a time drying process, such that the first application of dimensional ink cures for a time period of from about three (3) minutes to about five (5) minutes.

At step 205, the inkwell 92 is flooded with a subsequent application of dimensional ink. At step 206, the open side 90 of the screen 80, within the frame 82, is traversed by the immersion tool 94 controlled by the automated print apparatus 89. As the immersion tool 94 traverses the open side 90 of the screen 80, the subsequent application of dimensional ink, flooded into the inkwell 92 at step 205, is compressed and distributed through the interior mesh portion 84 of the screen 80, into the inkwell 92, and on to the outer substrate surface 18. In one example, the immersion tool 94 may complete two (2) stokes or passes of the open side 90 of the screen 80 to compress and distribute each application of dimensional ink, including the subsequent application of dimensional ink.

At step 207, an intermediate curing process is initiated for the subsequent application of the dimensional ink. The curing procedure for the dimensional ink may be one of time drying, heated curing or drying, or the like. In one example, the subsequent application of dimensional ink is cured via a time drying process, such that the subsequent application of dimensional ink cures for a time period of from about three (3) minutes to about five (5) minutes.

As shown in FIG. 11, steps 205-207 may be repeated until the height 64 of the respective raised lenticular features 58 is greater than 0.05 millimeters (mm), and, preferably, from about 0.07 millimeters (mm) to about 0.15 millimeters (mm).

In one example embodiment, wherein the height 64 is designed to be about 0.11 millimeters (mm), steps 205-207 are completed twice, such that the inkwell 92 is flooded first with the first application of dimensional ink, second with a subsequent application of dimension ink, i.e., a second application of dimensional ink, and third with another subsequent application of dimensional ink, i.e. a third application of dimensional ink.

In this example, the dimensional ink may applied in layers, as shown in FIGS. 3 and 4, such that the third layer 91, positioned between the outer substrate surface 18 and the second layer 93, corresponds to the first application dimensional ink; the second layer 93, positioned between the third layer 91 and the first layer 95, corresponds to the second application of dimensional ink; and the first layer 95, positioned between the second layer 93 and the terminus 62, corresponds to the third application of dimensional ink. In the same example, with each application of dimensional ink or application of each layer, the immersion tool 94 completes two (2) passes or strokes across the open side 90 of the screen 80 per ink layer 91, 93, 95, for a total of six (6) passes or strokes.

Referring back to FIG. 11, following the application and curing of the dimensional ink in steps 202-207, at step 208 the screen 80 may be removed from the outer substrate surface 18.

At step 209, an exterior coating may be applied to the cover 12, i.e., the outer substrate surface 18 and the raised lenticular features 58 defined by the dimensional ink. The exterior coating may be applied via a silk screening process or the like. The exterior coating may have a viscosity from about 60 decipascalsecond (dpa·s) to about 120 dpa·s and the Volatile Organic Compounds (VOCs) may be from about 825 g/L to about 870 g/L. The exterior coating may be water-based with a solid content percentage of from about 15% to about 17%.

At step 210, a final curing process is initiated for the exterior coating. The curing procedure for the exterior coating may be one of time drying, heated curing or drying, or the like.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A sports ball comprising:
    a cover having an outer substrate surface and a plurality of raised lenticular features that are disposed upon and extend from the outer substrate surface, wherein the plurality of raised lenticular features are formed from a pigmented dimensional ink, and wherein each of the plurality of raised lenticular features has a terminus that is spaced apart from the outer substrate surface by a height that is greater than about 0.05 millimeters (mm) and less than about 0.15 millimeters (mm);

wherein the cover, including the plurality of raised lenticular features, defines a plurality of directionally-based designs, the plurality of directionally-based designs including a first design defined by the raised lenticular features and a second design defined by the raised lenticular features; and wherein the first design is visible when the sports ball is viewed from a first viewing angle relative to a surface normal extending from the outer substrate surface, wherein the second design is visible when the sports ball is viewed from a second viewing angle relative to the surface normal.

2. The sports ball of claim 1, wherein the first viewing angle and second viewing angle are coplanar and on opposing sides of the surface normal.

3. The sports ball of claim 2, wherein the first design is visible when the first viewing angle is greater than about 15 degrees, and wherein the second design is visible when the second viewing angle is greater than about 15 degrees.

4. The sports ball of claim 3, wherein:
the cover further includes a plurality of land areas disposed between the plurality of raised lenticular features;
the plurality of directionally-based designs further includes a third design defined by the plurality of land areas; and
the third design is visible when the sports ball is viewed from a third viewing angle that is between the first viewing angle and the second viewing angle.

5. The sports ball of claim 1, wherein the cover further includes a plurality of land areas disposed between the plurality of raised lenticular features; wherein the plurality of raised lenticular features and the plurality of land areas define a surface profile that includes an alternating and repeating series of the land areas and the raised lenticular features, wherein each raised lenticular feature is positioned between a plurality of land areas.

6. The sports ball of claim 5, wherein the plurality of raised lenticular features form a series of concentric circles.

7. The sports ball of claim 1 wherein the dimensional ink is an opaque dimensional ink.

8. The sports ball of claim 7, wherein each of the plurality of raised lenticular features has a first portion including a first sidewall and a second portion including a second sidewall and wherein the first design is defined by the first portion and first sidewall of each of the plurality of raised lenticular features and the second design is defined by the second portion and second sidewall of each of the raised lenticular features.

9. The sports ball of claim 1, wherein the raised lenticular features are disposed upon a majority of the outer substrate surface.

10. The sports ball of claim 1, wherein the height is from about 0.07 millimeters (mm) to about 0.15 millimeters (mm).

11. The sports ball of claim 10, wherein the height is about 0.11 millimeters (mm).

12. A sports ball comprising:
a cover having an outer substrate surface and a plurality of raised lenticular features that are disposed upon and extend from the outer substrate surface, wherein the plurality of raised lenticular features are formed from a dimensional ink, and wherein each of the plurality of raised lenticular features has a terminus that is spaced apart from the outer substrate surface by a height that is greater than about 0.05 millimeters (mm), the cover further comprising a plurality of land areas disposed between the plurality of raised lenticular features;
wherein the cover, including the plurality of raised lenticular features and the plurality of land areas, defines a plurality of directionally-based designs, the plurality of directionally-based designs including a first design defined by the raised lenticular features, a second design defined by the raised lenticular features, and a third design defined by the plurality of land areas; and
wherein the first design is visible when the sports ball is viewed from a first viewing angle relative to a surface normal extending from the outer substrate surface, wherein the second design is visible when the sports ball is viewed from a second viewing angle relative to the surface normal, and wherein the third design is visible when the sports ball is viewed from a third viewing angle that is between the first viewing angle and the second viewing angle.

13. The sports ball of claim 12, wherein the first viewing angle and second viewing angle are coplanar and on opposing sides of the surface normal.

14. The sports ball of claim 13, wherein the first design is visible when the first viewing angle is greater than about 15 degrees, and wherein the second design is visible when the second viewing angle is greater than about 15 degrees.

15. The sports ball of claim 12, wherein the height is from about 0.07 millimeters (mm) to about 0.15 millimeters (mm).

16. A sports ball comprising:
a cover having an outer substrate surface, a plurality of raised lenticular features that are disposed upon and extend from the outer substrate surface, and a plurality of land areas disposed between the plurality of raised lenticular features, wherein:
each of the plurality of raised lenticular features has a terminus that is spaced apart from the outer substrate surface by a height that is greater than about 0.05 millimeters (mm);
each the plurality of raised lenticular features is formed from a dimensional ink and has a first portion including a first sidewall and a second portion including a second sidewall, wherein the dimensional ink includes a first dimensional ink of a first color and a second dimensional ink of a second color, and wherein the first portion is composed of the first dimensional ink and the second portion is composed of the second dimensional ink; and
each of the plurality of land areas is a third color;
wherein the cover, including the plurality of raised lenticular features and the plurality of land areas, defines a plurality of directionally-based designs, the plurality of directionally-based designs including a first design defined by the first portion and first sidewall of each of the plurality of raised lenticular features, and a second design defined by the second portion and second sidewall of each of the raised lenticular features; and
wherein the first design is visible when the sports ball is viewed from a first viewing angle relative to a surface normal extending from the outer substrate surface, and wherein the second design is visible when the sports ball is viewed from a second viewing angle relative to the surface normal.

17. The sports ball of claim 16, wherein the first color is different than the second color, and the third color is different than the first color and the second color.

18. The sports ball of claim 16, wherein:
the plurality of directionally-based designs further includes a third design defined by the plurality of land areas; and
the third design is visible when the sports ball is viewed from a third viewing angle.

19. The sports ball of claim 18, wherein the first viewing angle and second viewing angle are coplanar and on opposing sides of the surface normal, and wherein the third viewing angle is between the first viewing angle and the second viewing angle.

20. The sports ball of claim 19, wherein the first design is visible when the first viewing angle is greater than about 15 degrees, and wherein the second design is visible when the second viewing angle is greater than about 15 degrees.

* * * * *